United States Patent [19]

Raymond

[11] Patent Number: 4,763,907

[45] Date of Patent: Aug. 16, 1988

[54] UTILITY WAGON

[75] Inventor: Richard O. Raymond, Ferrisburg, Vt.

[73] Assignee: Country Home Products, Inc., Charlotte, Vt.

[21] Appl. No.: 34,941

[22] Filed: Apr. 6, 1987

[51] Int. Cl.$^4$ ............................................. B62B 11/00
[52] U.S. Cl. .......................... 280/47.35; 280/47.37 R; 280/47.38
[58] Field of Search ............... 280/47.34, 47.35, 47.36, 280/47.37, 47.4, 651, 659, 87.05, 87.01, 87.02 R, 47.11, 47.38

[56] References Cited

U.S. PATENT DOCUMENTS

| | | | |
|---|---|---|---|
| 1,842,159 | 1/1932 | Fleishman et al. | 280/47.35 |
| 2,362,186 | 11/1944 | Brantz | 280/47.4 |
| 2,544,099 | 3/1951 | Malin | 280/47.35 |
| 2,688,493 | 9/1954 | Rosenborg | 280/47.34 |
| 2,796,155 | 6/1957 | Cabler | 280/47.35 |
| 2,957,186 | 10/1960 | Williamson et al. | 280/47.37 R |

Primary Examiner—David M. Mitchell
Attorney, Agent, or Firm—Fay, Sharpe, Beall, Fagan, Minnich & McKee

[57] ABSTRACT

A front end wall and front side walls are hinged so that they may move from a work position extending upwardly to a downwardly extending storage position. Rear side walls and a rear end wall are rigidly connected together and fixed to the base of the wagon for supporting the side walls of the work position with latches. A removable shelf for a back rest can be supported by the rear side and end walls. A rigid rearwardly extending handle can be used to pivot the wagon about its large rear wheels to pick the front wheels up for steering and going over obstacles. The handle is slidingly unclamped to be movable to a storage position.

10 Claims, 2 Drawing Sheets

UTILITY WAGON

BACKGROUND OF THE INVENTION

Utility wagons, carts, dolleys, trailers, trucks, seats and the like, have various forms for specialized usage. There is always a need for a product that is specifically adapted well for some usages, has a wide variety of usage, and is not unreasonably expensive or complicated. The present invention relates to a utility wagon that is particularly adapted to yard and garden usage.

SUMMARY OF THE INVENTION

It is an object to satisfactorily provide the needs for a wagon of the above mentioned type.

When gardening or working in the yard there is a considerable amount of stooping and bending, plus the carrying of awkward and heavy loads. The wagon of the present invention services these needs in a functional, comfortable and enjoyable manner.

The side and end walls are hingedly connected to a planar horizontal base so that they may be secured in an upright work position for carrying loads or functioning as a container for various articles or the like. The sides may be folded down to provide a flat top bed for carrying other types of loads or for a seat for working or resting. Rear side and end walls are rigidly secured to each other and the base to further form the container and to rigidly hold a handle at a rearwardly and upwardly extending manner so that the handle may be used to easily transport the wagon, and tilt the front wheel upwardly for going over obstacles or for steering. To facilitate this, the rear wheels are considerably larger than the front wheels. The handle is pivotally mounted and selectively unclamped from its work position so that it may be moved forward into a compacted storage position. A shelf may be placed across the rear rigid side and end walls to act as a compartment cover, shelf, or the like. The shelf may be removed for various purposes.

DETAILED DESCRIPTION OF A PREFERRED EMBODIMENT

Figure 1:
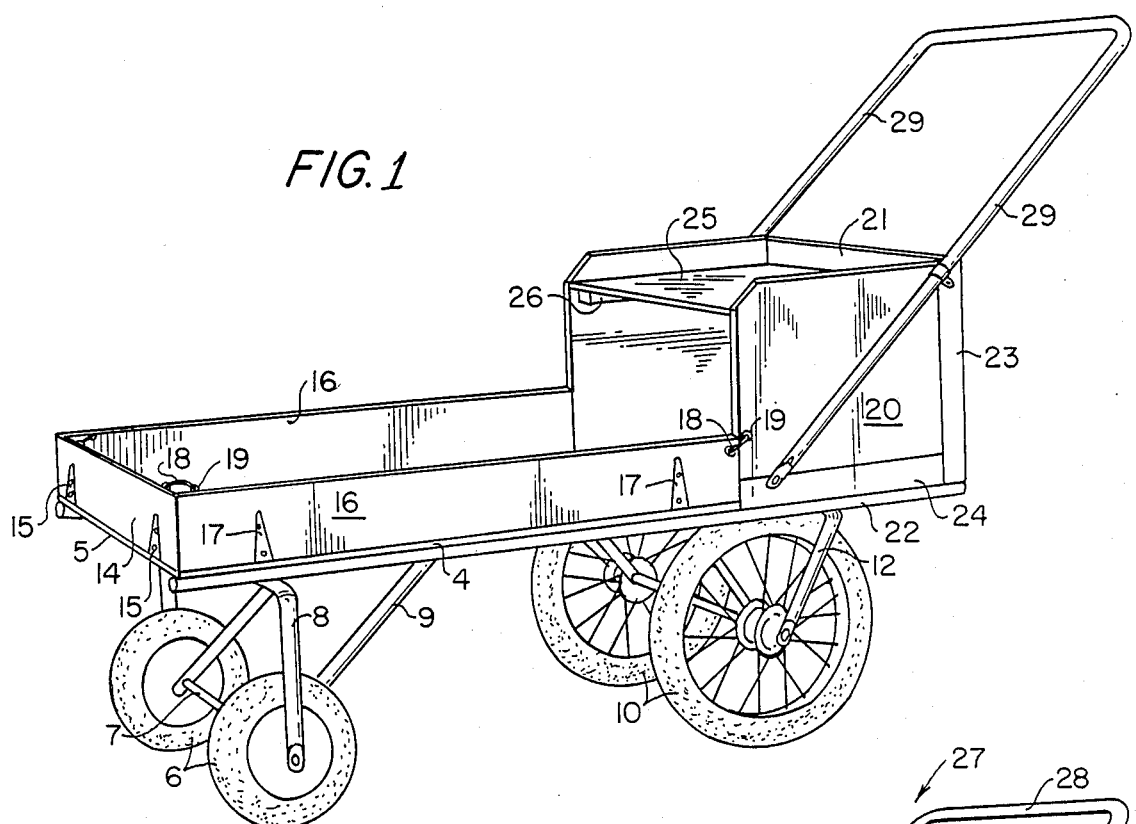
FIG. 1 is a top perspective view taken from the front left hand corner, with movable side and front end walls in a work position.

The utility wagon has a planar substantially continuous and solid rectangular rigid base 1 having a top surface 2, bottom surface 4, two side edges 4 and two end edges, particularly a front end edge 5 and a rear end edge, not shown. Two front wheels 6 are journalled together for parallel rotation, particularly about a common front axis defined by a rigid front axle 7. A first tube 8 is bent into a U-shape with its bite portion rigidly secured, for example by bolts (not shown) to the bottom surface of the base, and downwardly extending side legs that extend to the outside of the wheels 6, respectively, where their terminal ends have aligned holes for passing therethrough the axle 7. Any conventional type of securement may be made between the axle 7 and the legs of tube 8. A similar tube 9 has its bite portion secured to the bottom surface of the base rearward of the tube 8 and its legs extending to the inside of the wheels 6 and passing therethrough the shaft 7, for forming a triangulated rigid mounting for the front wheels. Thereby, front wheels are mounted on and below the base for supporting the front portion of the base on the wheels.

A pair of rear wheels 10 are substantially larger than the front wheels 6 and are connected together for rotation about a common axis. The common rear axis is defined by the rear axle 11. A tube 12 is bent into a U-shape so that its bite portion is secured to the bottom surface of the base 1 and its leg portions extend to the outside of the wheels 10 where they pass therethrough the axle 11, for purposes similar to the tube 8. A second tube 13 is bent into a U-shape so that its bite portion is secured to the bottom surface of the base at a distance spaced from leg portion of the tube 12, so that its legs will extend to the inside of the wheels 10, respectively, for passing therethrough the axle 11. The tubes 12 and 13 provide a triangulated rigid mounting for the axle 11 of wheels 10 in a manner similar to that of the front wheels. Thus, the rear wheels are mounted on and underneath the base for supporting the rear portion of the base. The rear wheels 10 together with the front wheels 6 maintain the base 1 parallel to a planar wheel support surface, such as the ground.

Figure 2:
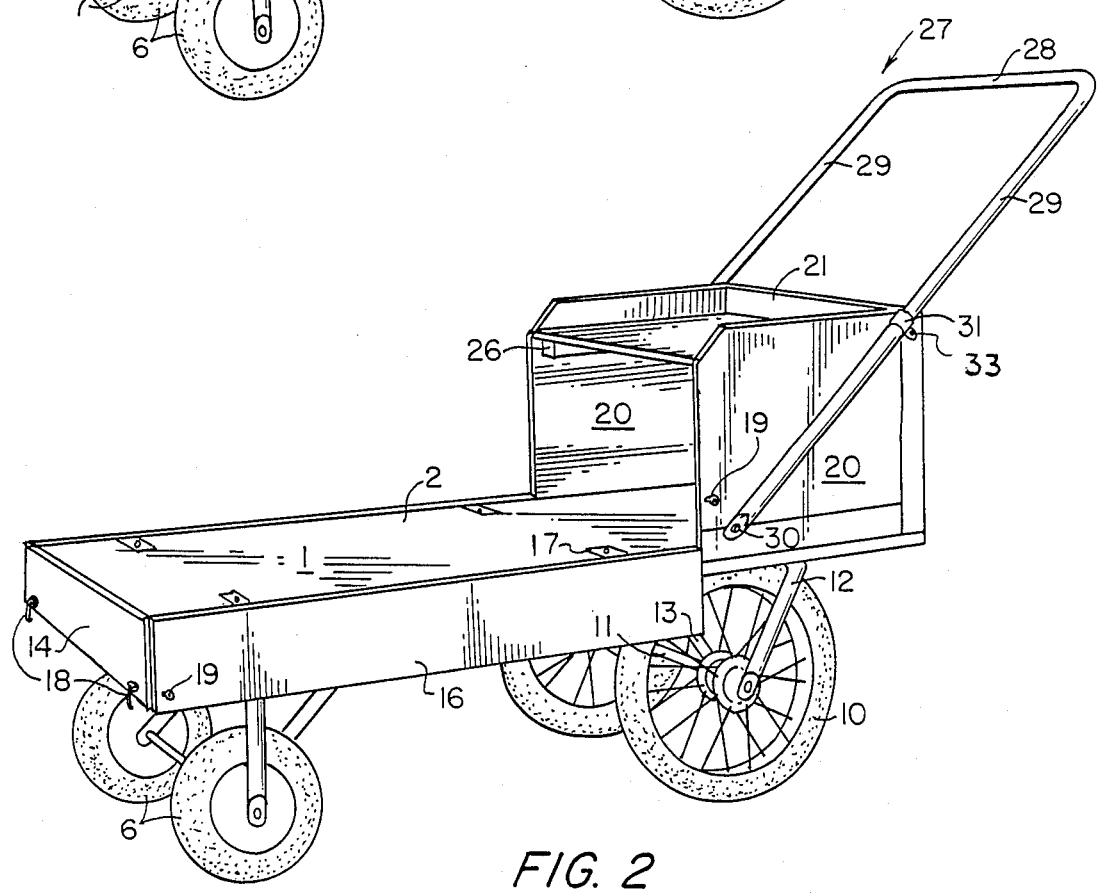
FIG. 2 is a view corresponding to FIG. 1, but with the front and side movable walls in their downwardly pivoted storage position.

A generally rectangular front end wall 14 is secured to the base 1. More particularly, a pair of conventional hinges 15 pivotally mount the front end wall 14 to the side edge 5 of the base 1 for pivotal movement between a vertically upwardly extending work position as shown in FIG. 1 and a vertically downwardly extending storage position as shown in FIG. 2. A pair of generally rectangular movable side walls 16 are secured to the base 1 and have a height substantially equal to the front end wall 14. A pair of conventional hinges 17 (only being shown with respect to one of the side walls, but being identical for the other side wall) are provided to pivotally mount the movable side walls 16 to the front portions of the side edges 4 of the base 1 for movement between a vertically upwardly extending work position as shown in FIG. 1 and a vertically downwardly extending storage position as shown in FIG. 2.

A latch, for example of the hook 18 and eye 19 conventional type, securely interconnects the opposite corners of the front end wall 14 that are remote from the hinges 15, that is the upper corners, to the adjacent corners, that is the upper front corners, of the side movable walls 16 when the front end wall 14 and the side movable walls 16 are in their upwardly extending work position, as shown in FIG. 1. These latches are unlatched to permit the front end wall 14 and the side walls 16 to extend downwardly in their storage position as shown in FIG. 2.

Rear fixed side walls 20 are generally coplanar and adjacent to the respective movable side walls 16. The rear fixed side walls 20 are rigidly connected to the adjacent side edges 4 of the base 1. A latch, for example the conventional hook 18 and eye 19 securely interconnects the rear upper corner of each movable side walls 16 with an adjacent portion of the rear fixed side walls 20, when the side walls 16 extend in their work position as shown in FIG. 1, and such latches are unlatched to permit the side wall 16 to move to their storage position shown in FIG. 2. More preferably, the hook and eye latches may be replaced by conventional wooden blocks that revolve around one fastening screw each, not shown.

A rear fixed end wall 21 is generally rectangular and rigidly connected to the rear end edge (not shown) of the base 1 and the adjacent edges of the rear fixed side walls 20. The rear fixed end wall 21 and the rear fixed side walls 20 extend upwardly from the base a distance substantially greater than, and preferably more than twice, the height of the front movable side and front end walls 16, 14, as shown in FIG. 1.

A reinforcing tube 22, which alternatively could be a channel metal member, is connected to and extends along the lower surface of the base 1 adjacent the edges 4, to reinforce the base and provide greater rigidity. Right angle members 23 and 24 respectively connect the rear fixed side walls to the rear fixed end wall and the base, in addition to providing rigidity. The joint between the reinforcing tube 22, the channel members 23, 24 and their sides and base may be with holes in the tubes and channel members and screws or bolts passing through the sides and the base. Preferably, the sides are constructed of oak and base is constructed of plywood, while the tubes, axles and channels are constructed of metal, preferably steel.

A rectangular shelf 25 has a width substantially equal to the width of the base 1 minus the thickness of the rear fixed side walls 20 and a substantially equal to the length of the rear fixed side walls, so that it may be secured between the rear fixed side walls 20 and the rear fixed end wall 21 in a position spaced above and parallel to the base 1. Preferably, the securement is by means of bearing blocks 26 upon which the shelf 25 rests, with the bearing blocks 26 being glued and/or screwed or the like to the rear fixed side walls 20 and 21 (not shown). Preferably, the shelf 25 merely rests upon the bearing blocks 26 so that the shelf 25 may be easily removed. Also, releasable fasteners could be provided between the shelf 25 and the bearing block 26 or the fixed walls 20, 21. The bearing blocks 26 extend to the rear wall 21 with a spacing between the wall 21 and each block about equal to the thickness of the shelf 25, so that the shelf 25 may be stored in a vertical position between the wall 21 and blocks 26 in parallel adjacent position to the wall 21. Preferably, the block is discontinuous in the middle for passage of the backrest as shown in FIG. 3.

Figure 4:
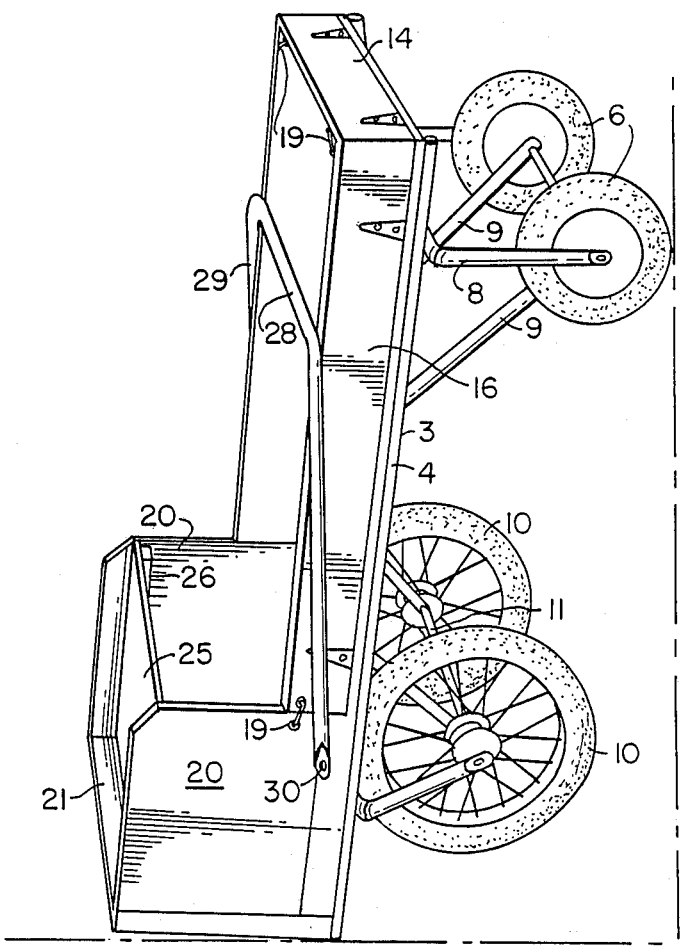
FIG. 4 is a top perspective view, with the handle and wagon in storage position.

A handle 27 is preferably constructed of bent tubular steel and formed in a substantially U-shape. The handle 27 has a bite portion 28 that would be gripped by the user when manipulating the cart or wagon, which bite portion is substantially parallel to the base 1 and both above and rearward of the rear fixed end wall 21 when in the work position as shown in FIGS. 1 and 2. The handle has opposite side arms 29, which extend from the bite portion to the rear fixed side walls 20 and along the rear fixed side walls at an acute angle with respect to the base 1, when in the work position of FIGS. 1 and 2. The terminal ends of the arms 29 of the handle 27 are flattened and drilled or otherwise apertured for the receipt of a fastener 30 used to pivotally secure the arms of the handle 27 to the base and rear fixed side walls, particularly directly to the rear fixed side walls. The arms extend along the outside of the rear fixed side walls so that the handle may be pivoted from its work position shown in FIGS. 1 and 2 about the axis of the fastener 30 to a storage position wherein the side arms 29 extend generally parallel to the base 1 and the bite portion 28 overlies the forward portion of the movable side walls 16 and base 1 as shown in FIG. 4.

A clamp 31, preferably a bracket with a threaded fastener of a conventional type, is used for securing a mid portion of each (only one clamp 31 being shown) of the handle side arms 29 to the upper rear portion of each rear fixed side wall to rigidly secure the handle 27 to the rear fixed side walls 20 and base 1, particularly directly to the side walls 20, so that a downward force on the bite portion will pivot the front wheels upwardly about the axis of the rear wheels 10. In this manner, the handle 27 may easily move the wagon about. Each clamp 31 is secured by only one fastener 33, so that the handle may be placed on the opposite side of the fastener, the clamp rotated 180 degrees about the axis of the fastener and the handle secured in the new position to provide adjustment for different height people.

Figure 3:
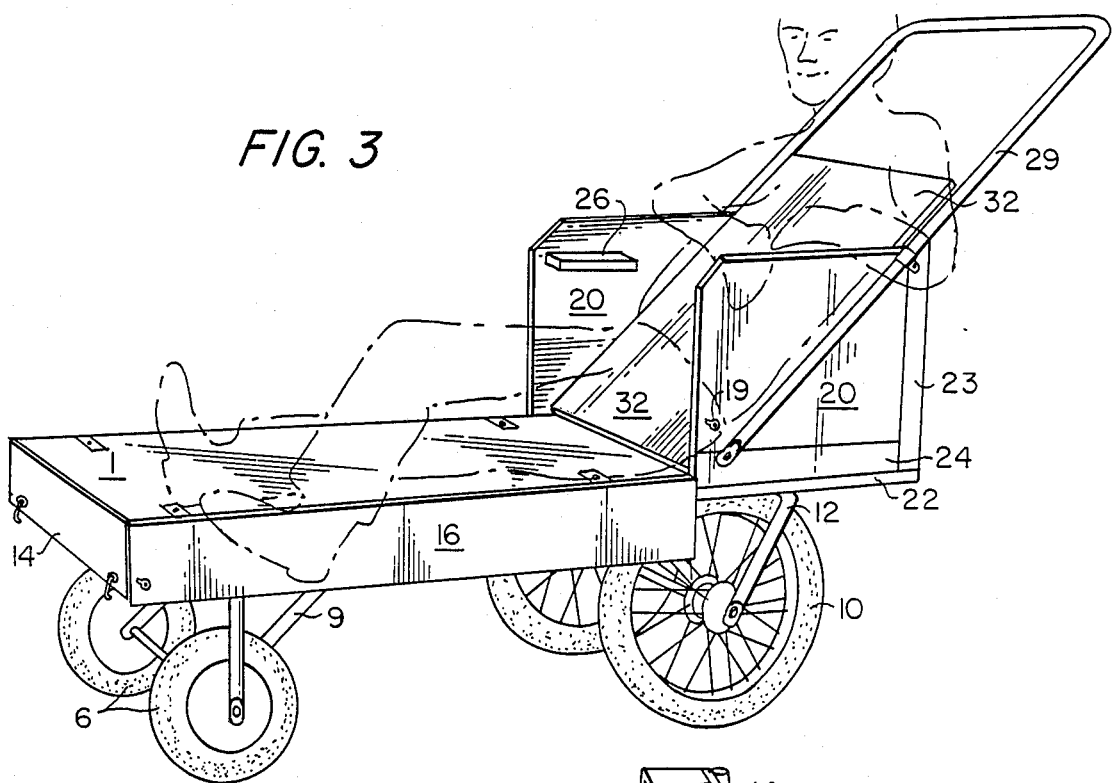
FIG. 3 is a view similar to FIG. 2, but with a shelf removed and a larger back rest installed.

As shown in FIG. 3, the wagon, when in the orientation of FIG. 2, may have the shelf 25 removed and angled between the base and the rear fixed end wall 21 (such a position not being shown) to provide a back rest, or it may simply be stored at a convenient location. A convenient location would be on the base 1 immediately below its shelf position of FIG. 1, which storage position is not shown. Additionally, with the shelf 25 being removed from its FIG. 1 position, a back board, preferably made of plywood like the shelf 25, may be provided in an angled position between the base 1 and the upper edge of the rear end wall 21, to extend inside of and between the fixed rear walls 20. Such back board 32 would preferably be of the same width of the shelf 25, but of a substantially greater length. In such a position, the back board 25 would preferably stand at the same angle as the handle 29 and as shown in FIG. 3, the wagon would now function as a chaise lounge, with the rear fixed side walls 20 functioning as arm rests.

With the side walls 16 in their lower storage position of FIG. 2, the base 1 may be used as an arm rest when sitting on the ground and working, as a seat when resting or working, or as a brace when arising from a ground seated position. Further, the hinges are of a type, which can be conventional, wherein the hinge pin may be removed so that the side walls 16 and end wall 14 may be completely removed, or the hinges may merely be removed in their entirety by removing the threaded fasteners that secure them.

With the four wheels, the cart stays flat, even when rolling. One can stop and rest, without having to support the cargo as in two wheel or one wheel devices. The fixed front wheels provide rigidity, strength and reliability at a reduced cost, without sacrificing steering ability because the large rear wheels and handle provide steering ease as mentioned above by merely pushing downward on the rigid angularly extending handle so that the front wheels are lifted up off the ground. In this manner, the front wheels can also be raised over obstacles, the cart moved forward, and thereafter the handle raised up to help the rear wheels over the obstacle.

With one or two wheeled carts, such as wheel barrows and a typical common garden cart, during rolling, one is always exerting some vertical force to balance the load. This is unnecessary with the four wheeled vehicle of the present invention. This continued lifting up and balancing of the prior art is strenuous and cannot be done by some people due to the strain of lower back, arms and shoulders, with respect to the conventional one or two wheeled carts. With the present wagon, the load completely rests upon the base supported by four wheels and one only needs to walk while holding onto the handle.

Preferably, the height of the base is 15 inches from the ground. Preferably, the tubing is 1 inch steel tube for strength and rigidity. The axles are preferably ½ inch plated steel rod. The front wheels are preferably semi-pneumatic wide gauge wheels with roller bearings, steel hubs, and rubber tires. The rear wheels are preferably heavy duty spoked 14 inch semi-pneumatic with rubber tires and ball bearings. Preferably, the channels are galvanized steel that provide the above-mentioned bracing and additionally provide edge protection against wear. While threaded fasteners such as screws may be employed, it is preferable to provide bolts for all securement. Preferably, the shelf 25 is 15×22 inches and the base is 22 inches wide by 4 feet long, on one model and 36 inches long on another model.

With the handle folded as shown in FIG. 4, the wagon may be stood vertically on end and rest up against a wall as illustrated, to conserve storage space.

Due to the rear fixed wall 21 being higher than the base 1 with the sides down as shown in FIG. 2 or higher than the front fixed wall 14 as shown in FIG. 1, the front wheels could be raised so that the top edge of the wall 14 would be the same height as the top edge of the wall 21 to provide a two wheeled vehicle for supporting a large load. For example, a canoe could be rested in this manner, with a handle removed or the handle extending within the inside of the canoe to further steady the canoe, and the canoe could be pulled by its usual front painter or a similar long load could be grasped to move the load and wagon together.

From the above represented uses of the present invention, it is seen that the structural features are so interrelated as to provide a versatile and useful wagon.

Further objects, feature and advantages together with modifications and further embodiments are all contemplated according to the spirit and scope of the present invention, as fully defined by the following claims.

I claim:

1. A utility wagon, comprising:
   a planar, substantially continuous and solid rectangular rigid base having a top surface, bottom surface, and four side and end edges;
   two front wheels journalled together on a common axle for rotation;
   means for mounting said front wheels on and below said base for supporting the front portion of said base above the wheels;
   a pair of rear wheels being connected together for rotation about a common rear axis;
   means for mounting said rear wheels on and beneath said base for supporting the rear portion of said base and together with said front wheels maintaining said base parallel to a planar wheel support surface;
   a generally rectangular front end wall;
   hinge means pivotally mounting said front end wall to the side edge of said base for pivotal movement between a vertical upwardly extending work position and a vertical downwardly extending storage position;
   a pair of generally rectangular movable side walls;
   hinge means pivotally mounting said movable side walls to the front portions of said base side edges for movement between a vertical upwardly extending work position and a vertical downwardly extending storage position;
   latch means for securely interconnecting opposite corners of said front wall that are spaced from said hinge means respectively to adjacent corners of said side movable walls, when said front end wall and side movable walls are in their upwardly extending work position;
   rear fixed side walls being generally coplanar and adjacent to respective movable side walls;
   means rigidly connecting said rear fixed side walls to adjacent side edges of said base; and
   a rear fixed end wall rigidly connected respectively to the end edge of said base and the adjacent edges of said rear fixed side walls, said rear fixed side and end walls extending upwardly from said base a distance substantially greater than said front movable side and front end walls.

2. A utility wagon according to claim 1, further including a rectangular shelf having a width substantially equal to the width of said base minus the thickness of said rear fixed side walls and a length substantially equal to the length of said rear fixed side walls.

3. A utility wagon according to claim 2, further including a generally U-shaped handle having a bite portion substantially parallel to said base and both above and rearward of said rear fixed end wall when in a work position, said handle having opposed side arms extending from said bite portion to said rear fixed side walls and along said rear fixed side walls at an acute angle with respect to said base in a work position.

4. A utility wagon according to claim 3, further including means pivotally securing the terminal end portions of said handle side arms to the outside of said base and rear fixed side walls, so that said handle may be pivoted from said work position to a storage position wherein said side arms extend generally parallel to said base and said bite portion overlies the forward portion of said movable side walls and base.

5. A utility wagon according to claim 4, further including clamp means for securing a midportion of each of said handle side arms to the upper rear portion of said rear fixed side walls to rigidly secure said handle to said side walls and base so that a downward force on said bite portion will pivot said front wheels upwardly about the axis of said rear wheels.

6. A utility wagon according to claim 1, further including a generally U-shaped handle having a bite portion substantially parallel to said base and both above and rearward of said rear fixed end wall when in a work position, said handle having opposed side arms extending from said bite portion to said rear fixed side walls and along said rear fixed side walls at an acute angle with respect to said base in a work position.

7. A utility wagon according to claim 6, further including means pivotally securing the terminal end portions of said handle side arms to the outside of said base and rear fixed side walls, so that said handle may be pivoted from said work position to a storage position wherein said side arms extend generally parallel to said base and said bite portion overlies the forward portion of said movable side walls and base.

8. A utility wagon according to claim 7, further including clamp means for securing a midportion of each of said handle side arms to the upper rear portion of said rear fixed side walls to rigidly secure said handle to said side walls and base so that a downward force on said bite portion will pivot said front wheels upwardly about the axis of said rear wheels.

9. A utility wagon according to claim 1, wherein said front wheels are journalled about a fixed axis.

10. A utility wagon according to claim 1, further including a rectangular rigid sheet back rest engaging said base at one end, extending upwardly and rearwardly between said rear-fixed side walls and engaging the top edge of said rear fixed end wall, to provide a chaise lounge when said movable side walls are in said storage position and said rear fixed side walls provide arm rests.

* * * * *